(12) United States Patent
Holmgren et al.

(10) Patent No.: US 8,624,744 B2
(45) Date of Patent: Jan. 7, 2014

(54) ARRANGEMENT AND METHOD FOR DETERMINING POSITIONS OF THE TEATS OF A MILKING ANIMAL

(75) Inventors: Hans Holmgren, Stockholm (SE); Thomas Axelsson, Farsta (SE); Bohao Liao, Sollentuna (SE)

(73) Assignee: Delaval Holding AB, Tumba (SE)

( * ) Notice: Subject to any disclaimer, the term of this patent is extended or adjusted under 35 U.S.C. 154(b) by 602 days.

(21) Appl. No.: 12/812,635

(22) PCT Filed: Jan. 16, 2009

(86) PCT No.: PCT/SE2009/050040
§ 371 (c)(1),
(2), (4) Date: Jul. 13, 2010

(87) PCT Pub. No.: WO2009/093965
PCT Pub. Date: Jul. 30, 2009

(65) Prior Publication Data
US 2010/0289649 A1 Nov. 18, 2010

(30) Foreign Application Priority Data
Jan. 22, 2008 (SE) ........................ 0800149

(51) Int. Cl.
*G08B 21/00* (2006.01)
(52) U.S. Cl.
USPC .................... 340/573.3; 340/573.1; 340/540; 348/46; 348/135; 119/14.02; 119/14.08
(58) Field of Classification Search
USPC .............. 340/573.3, 573.1, 540; 348/46, 135; 119/14.02, 14.08
See application file for complete search history.

(56) References Cited

U.S. PATENT DOCUMENTS

| 4,805,557 A | * | 2/1989 | van der Lely et al. ..... 119/14.08 |
| 6,118,118 A | | 9/2000 | Lely et al. |
| 2005/0115506 A1 | * | 6/2005 | Van Den Berg et al. ... 119/14.03 |

FOREIGN PATENT DOCUMENTS

| EP | 0880889 A2 | 12/1998 |
| EP | 1460453 A1 | 9/2004 |

(Continued)

OTHER PUBLICATIONS

Examination Report, issued Jan. 26, 2012 in corresponding New Zealand Application No. 586159, 6 pages.
International Search Report of PCT/SE2009/050040, mailed on Jun. 4, 2009, 7 pages.

(Continued)

*Primary Examiner* — Mohammad Ghayour
*Assistant Examiner* — Mark Rushing
(74) *Attorney, Agent, or Firm* — Finnegan, Henderson, Farabow, Garrett & Dunner, LLP

(57) ABSTRACT

An arrangement is provided for attaching teat cups to teats of a milking animal in a rotary milking system having a milking stall for housing the milking animal during milking. The arrangement comprises a three-dimensional camera configured to be directed towards the udder of the milking animal in the milking stall and to repeatedly record three-dimensional images of the udder of the milking animal in real time. The three-dimensional camera is further configured to be directed towards the teat cups located in a magazine and to repeatedly record three-dimensional images of the teat cups in real time. The arrangement also includes an image processing device configured to repeatedly detect the teats of the milking animal and determine the positions of the teats in three spatial dimensions based on said repeatedly recorded three-dimensional images of the teats. The image processing device is also configured to repeatedly detect the plurality of teat cups and determine the positions of the teat cups in three spatial dimensions based on said repeatedly recorded three-dimensional images of the teat cups located in the magazine. The arrangement also includes a control device configured to control a robot arm, based on the determined positions of the teats of the milking animal and the determined positions of the teat cups, to automatically attach at least one teat cup to at least one teat of the milking animal in the milking stall.

23 Claims, 3 Drawing Sheets

(56) References Cited

FOREIGN PATENT DOCUMENTS

| EP | 1523879 A2 | 4/2005 |
| EP | 1537774 A1 | 6/2005 |
| EP | 1537775 A1 | 6/2005 |
| NZ | 285631 | 5/1997 |
| WO | WO 2005/094565 * | 3/2005 |
| WO | WO 2007/104124 A1 | 9/2007 |

OTHER PUBLICATIONS

Oggier et al., *An all-solid-state optical range camera for 3D real-time imaging with sub-centimeter depth resolution (SwissRanger™)*, available at http://www.mesa-imaging.ch/ on Dec. 27, 2007, 12 pages.

Oggier et al., *3D-Imaging in Real-Time with Miniaturized Optical Range Camera*, available at http://www.mesa-imaging.ch/ on Dec. 27, 2007, 6 pages.

* cited by examiner

ARRANGEMENT AND METHOD FOR DETERMINING POSITIONS OF THE TEATS OF A MILKING ANIMAL

This is a U.S. National Phase application of PCT/SE2009/050040, filed Jan. 16, 2009, which claims priority to Swedish Patent Application Number 0800149-7, filed Jan. 22, 2008, both of which are incorporated herein by reference in their entirety.

TECHNICAL FIELD OF THE INVENTION

The present invention generally relates to dairy farm robot milking and to automatic attachment of teat cups related thereto.

DESCRIPTION OF RELATED ART AND BACKGROUND OF THE INVENTION

WO 2007/104124 discloses a teat location system for automated milking systems comprising a sensor housing mounted on a robot arm for sensing the location and attitude of teats on an udder. The output of the sensor is used to control the application of the automated milking apparatus that includes milking cups that are also mounted on the robot arm. The milking apparatus is adapted to receive instructions characterizing the location of the teats, to move the robot arm to such location so as to engage the milking cups onto the teats.

The sensor housing includes a modulated light source for radiating throughout the field of view that encompasses the udder, the teats and the hind legs of the animal. Further, the sensor housing includes a camera, control, image capture and readout electronics and suitable optics. The camera consists of a two-dimensional array of pixels, each of which can report time of flight data synchronized to the light source, as well as intensity.

SUMMARY OF THE INVENTION

However, there are some drawbacks with the teat location system disclosed above. The location of the sensor including the time of flight camera, being mounted on the robot arm, may cause difficulties to view all teats of an animal, particularly simultaneously. As a consequence the teat cup attachment procedure may fail, or at least be prolonged.

Further, the location of the sensor housing renders its use in a rotary milking system with several robot arms inappropriate.

Yet further, the location of the sensor may limit the use of the sensor for other purposes in the milking system.

Still further, the sensor is very much exposed to a dirty and unpredictable environment in immediate proximity of the animal. The sensor may easily get soiled and dirty or even get damaged. As a consequence, the sensor will not operate properly or not operate at all.

In particular, in a rotary milking system with moving platforms, moving milking stations and milking equipment, and moving animals, it has been found that a sensor mounted on the robot arm is inappropriate.

Accordingly, it is an object of the present invention to provide an arrangement and a method for determining positions of the teats of a milking animal in a milking system comprising a milking stall for housing the milking animal during milking, a movable robot arm for automatically attaching teat cups to the teats of the milking animal in the milking stall, and a control device for controlling the movement of the robot arm based on determined positions of the teats of the milking animal, which arrangement and method alleviates or mitigates the drawbacks of the prior art as set forward above.

It is a further object of the invention to provide such an arrangement and such a method, which are robust, effective, fast, precise, accurate, reliable, safe, easy to use, and of low cost.

It is still a further object of the invention to provide such an arrangement and such a method, which are capable of obtaining a very high number of correct teat cup attachments.

These objects among others are, according to the present invention, attained by arrangements and methods as claimed in the appended patent claims.

According to one aspect of the invention an arrangement for determining positions of the teats of a milking animal comprises a three-dimensional camera, preferably a time-of-flight camera, directable towards the udder of the milking animal in the milking stall for repeatedly recording three-dimensional images of the udder of the milking animal in real time, and image processing means for repeatedly detecting the teats of the milking animal and determining their positions in all three spatial dimensions based on the repeatedly recorded three-dimensional images. The image processing means is comprised in or operatively connected to the control device of the milking system. The arrangement is implemented in a rotary milking system, wherein the three-dimensional camera is preferably located at a fix position with respect to a floor, on which the rotary milking system is installed and with respect to which a rotary platform of the rotary milking system rotates during milking. The location of the three-dimensional camera provides for the detection and location of all the teats of the milking animal simultaneously.

By such arrangement the control device may control the robot arm very fast and accurately. The three-dimensional real time measurements and the subsequent processing of the measurement data provide high quality information extremely fast and as a result the milking system is capable of operating at higher speed. The milking time will be shorter and the throughput of animals is increased.

Further, a single three-dimensional camera can serve several or all of the milking stalls of the milking system. The fast operation of the inventive arrangement is required since the milking stalls are moving (rotating) with respect to the three-dimensional camera.

In such a milking system the position of the teat cups when being stored in e.g. a magazine, i.e. when not being used, may not be known. However, the three-dimensional camera of the inventive arrangement may be directed towards teat cups located in the magazine and provided to repeatedly record three-dimensional images of the teat cups in real time. Hereby the image processing means is capable of detecting the teat cups and determining their positions in all three spatial dimensions in the magazine.

The three-dimensional camera can be located at a side of the milking animal and be directed essentially sideways, i.e., horizontally, towards the udder of the milking animal. Alternatively, the three-dimensional camera can be located below the milking animal and be directed upwards towards the udder of the milking animal.

The above positions/orientations of the camera seem to be the most favorable ones in order to fast locate the udder and the teats of the milking animals. The camera positions/orientations seem to provide the best contrast between the udder/teats and other objects in the view field of the camera. Other orientations may be conceivable.

Further, the camera may be movable between several positions/orientations depending on the application or status of the camera.

Further embodiments of the inventive arrangement are set out in the dependent claims.

According to a second aspect of the invention a method for determining positions of the teats of a milking animal is provided. According to the method a three-dimensional camera, preferably a time-of-flight camera, is directed towards the teats of the milking animal in the milking stall, three-dimensional images of the teats of the milking animal are repeatedly recorded in real time by the three-dimensional camera, and the teats of the milking animal are repeatedly detected and their positions are determined in all three spatial dimensions based on the repeatedly recorded three-dimensional images. The method is implemented in a rotary milking system, wherein the three-dimensional camera is located at a fix position with respect to a floor, on which the rotary milking system is installed and with respect to which a rotary platform of the rotary milking system rotates during milking.

An advantage of the present invention is that the determination of the positions of the teats of an animal in all three spatial coordinates is made very fast. The invention provides in particular for the recording of three-dimensional images in real time and all visible teats can be detected, and the positions of all the teats can be determined, simultaneously. Hence, teat cup attachment can be made very fast.

Further characteristics of the invention, and advantages thereof, will be evident from the following detailed description of preferred embodiments of the present invention given hereinafter and the accompanying FIGS. 1-5, which are given by way of illustration only, and are thus not limitative of the present invention.

BRIEF DESCRIPTION OF THE DRAWINGS

FIGS. 1 and 3 are top views while FIG. 2 is a perspective view.

DETAILED DESCRIPTION OF EMBODIMENTS

Figure 1:
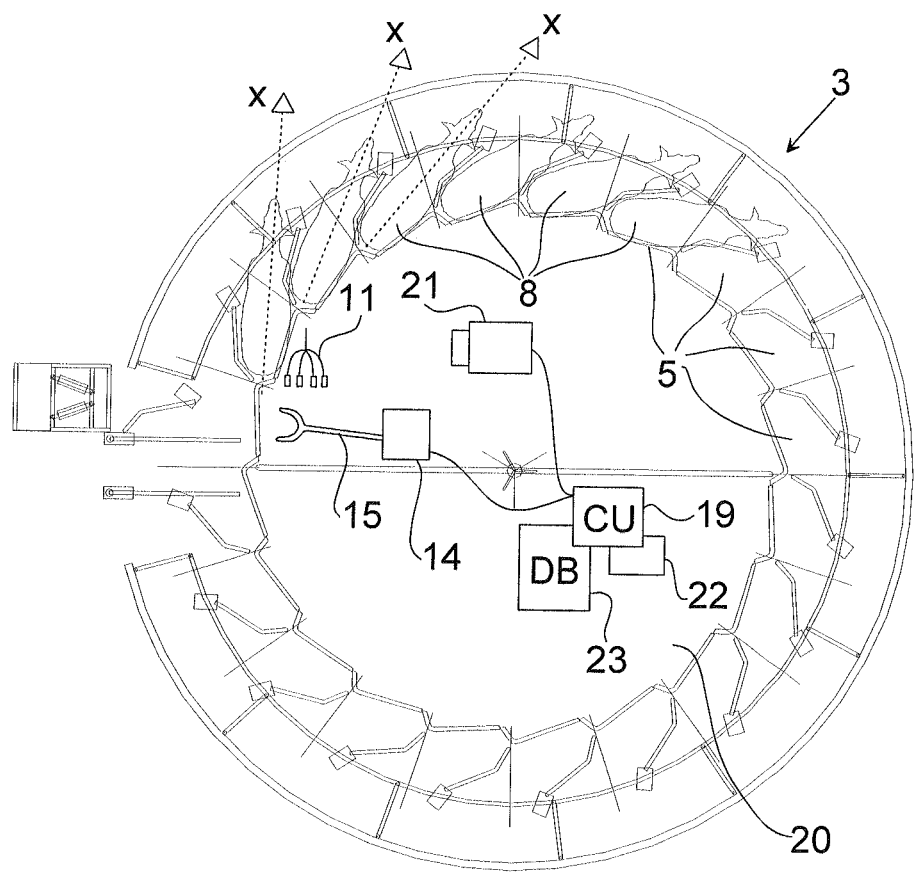
FIGS. 1-3 display each a schematically outlined milking system including an arrangement for determining positions of the teats of a milking animal according to a respective embodiment of the present invention.

In FIG. 1 is shown a milking system, in which an arrangement for determining positions of the teats of milking animals according to an embodiment of the invention is implemented. The rotary milking system 3 comprises a plurality of milking stalls 5, which milking animals 8 enter in a sequential order. Each of the milking stalls 5 comprises milking equipment including teat cups that are attached to the teats of the milking animal present in the milking stall prior to milking. For sake of simplicity teat cups 11 are illustrated only for one of the milking stalls 5. The rotary milking system 3 may be of parallel, tandem, or herringbone configuration. In the parallel configuration the longitudinal directions of the milking stalls and of the milking animals therein extend radially (the milking animals stand side by side), in the tandem configuration the longitudinal directions of the milking stalls and of the milking animals therein extend circumferentially (the milking animals stand one after the other), and in the herringbone configuration, which is illustrated in FIG. 1, the longitudinal directions x of the milking stalls and of the milking animals therein extends partly radially, partly circumferentially.

A robot 14 provided with a robot arm 15 is provided for automatically attaching teat cups 11 to the teats of the milking animals 8 present in the milking stalls 5 under the control of a control device 19, which is operatively connected to the milking robot 14. The milking robot 14 is preferably stationary with respect to a rotatable carousel or rotating platform 20 of the rotary milking system 3, which forms the support for the milking stalls 5. Alternatively, the milking robot 14 is movable back and forth in e.g. a circumferential direction.

The rotating platform 20 may, for each of the milking animals, be kept still while the milking robot 14 automatically attaches teat cups 11 to the teats of the milking animal 8, and is rotated there in between. Alternatively, the rotating platform is rotated continuously during the attachment of the teat cups and the milking of the milking animals 8.

In order to determine positions of the teats of the milking animals 8 present in the milking stalls 5, and thus be capable of moving the teat cups 11 to the teats of the milking animal, a three-dimensional camera 21, preferably a time-of-flight camera, is provided. A commercially available camera that can be used in the present invention is the SwissRanger SR3000 from Mesa Imaging AG, Switzerland. The SR3000 is a general purpose range three-dimensional real time imaging camera. The camera can easily be connected to a computer via USB 2.0, enabling straightforward measurement of real-time depth maps. Designed for operation under lighting conditions, the compact camera is offered with a complete visualization software program.

The camera and the technique behind the camera are further disclosed in the publications "An all-solid-state optical range camera for 3D real-time imaging with sub-centimeter depth resolution (SwissRanger™)" and "3D-Imaging in Real-Time with Miniaturized Optical Range Camera" by T. Oggier et al. and available at the Mesa Imaging AG Internet site http://www.mesa-imaging.ch/ on Dec. 27, 2007. The contents of the above publications are hereby incorporated by reference.

The three-dimensional camera 21 is, for each of the milking animals in the milking stalls, directed towards the udder of the milking animal, wherein the three-dimensional camera repeatedly records three-dimensional images of the udder of the milking animal in real time. Image processing means 22 is provided, for each of the milking animals, for repeatedly detecting the teats of the milking animal and determining their positions in all three spatial dimensions by a calculation method based on the repeatedly recorded three-dimensional images of the udder of the milking animal.

The three-dimensional camera 21 thus determines directly the position in all three spatial coordinates for each object point that is found in the pixels of the image recorded. Thus, the coordinates are in principle determined in real time.

The image processing means 22 is preferably implemented as a software module in the control device 19, which thus is operatively connected to the three-dimensional camera 21, or in any other device operatively connected to the three-dimensional camera 21 and the control device 19. Yet alternatively, the software module may be integrated into the three-dimensional camera 21 itself.

The calculation method used can be any calculation method suitable for use in the field of digital image processing.

In particular, the calculation method involves the formation of a three-dimensional surface representation, i.e. a topography or elevation map, of a portion of the milking animal 8 from the three-dimensional image of the milking animal, the analyzing of the surface of the three-dimensional surface representation, and the determination of the position of the teats of the milking animal 8 based on the analysis of the surface of the three-dimensional surface representation. Thus, the intensity or color of the pixels of the three-dimensional image may not be used at all in the calculation method for detecting and locating the teats of the milking animal.

The analysis preferably includes the comparison of elevation gradients of the surface of the three-dimensional surface representation with reference gradients. This may be implemented by comparing elevations of portions of the surface of the three-dimensional surface representation located adjacent one another.

By such measures full use of the three-dimensional imaging is made. The analysis follows the surface of the udder and the surface of the teats to thereby detect, identify and locate the teats fastly and efficiently. Simultaneously, background noise may easily be removed from the image since it is located at an distance from the camera which is entirely different from the distance between the teats of the milking animal and the camera. The three-dimensional real time camera 21 can be mounted in fixed positions with respect to the different parts of the milking system 3 depending on the application in question. The camera 21 can be located at a fix position with respect to a floor, on which the rotary milking system 3 is installed and with respect to which the rotary platform 20 of the rotary milking system 3 rotates during milking. In such instance, the camera 21 may be mounted in a ceiling of a building in which the milking system is installed or on a frame or fence surrounding the rotary platform 20. Such position may enable the inventive arrangement to detect and determine all the teats of the milking animal 8 simultaneously.

Alternatively, the camera 21 is mounted on the rotating platform 20 or on the robot arm 15. Still alternatively, the camera 21 is movable along some path. In one version, for instance, the three-dimensional camera 21 can be movable between a first position, in which the camera 21 is located during the detections of the three-dimensional images, and a second position, in which the camera 21 is located there in between, that is, when being idle.

The three-dimensional real time camera 21 can further be located in a number of different positions and orientations depending on the application in question. The camera 21 can, during each of the recordings of the three-dimensional images of the udder of each of the milking animals, be located at a side of the milking animal and be directed essentially sideways in the horizontal plane and perpendicular to a longitudinal direction of the milking animal. Alternatively, the camera 21 can, during each of the recordings of the three-dimensional images of the udder of each of the milking animals, be located below the milking animal and be directed upwards.

Still further, two or more three-dimensional real time cameras can be provided operatively connected to the control device 19 in order to provide further detailed three-dimensional information of the positions and orientations of the teats of the milking animals.

For instance, several of the three-dimensional real time cameras seem to be advantageous if they are not mounted fixedly on the robot arm since at least one teat would always be obscured. Further, one or several three-dimensional real time cameras arranged stationary on the floor or on the rotating platform could be combined with one three-dimensional real time camera mounted on the robot arm, or a single three-dimensional real time camera mounted on the robot arm could be used in the invention.

The speed and accuracy of the arrangement for determining teat positions as provided by the three-dimensional real time measurements are of outermost importance in order to provide a milking system with accurate and fast automatic attachments of teat cups to teats of milking animals. This is of particular importance in a rotary milking system where not only the robot arm for attaching the teat cups is movable, but also the entire robot may be movable. Further, the rotating platform and the milking stalls are moving (rotating).

Since also the milking stalls and the milking equipments belonging to the milking stalls are moving it is typically not known—at least not in a fixed coordinate system—where the teat cups are located, particularly when they are stored in a magazine (not illustrated) in each of the milking stalls.

In a rotary milking system it may be particularly difficult to find the magazines since they may appear in different positions in different milking stalls, and the position of a magazine in a milking stall can be stored only if the position of the milking stall is monitored.

The three-dimensional real time camera 21 of the inventive arrangement may thus be provided to record three-dimensional images of the teat cups 11 in real time, particularly when the teat cups 11 are located in the magazine, and the image processing means 22 detects the teat cups and determines their positions in all three spatial dimensions by the above calculation method based on the recorded three-dimensional images of the teat cups when being located in the magazine.

In another embodiment of the present invention the three-dimensional real time camera 21 can be used to establish a position of each of the milking animals in at least one spatial dimension, e.g. a longitudinal direction x or in a direction perpendicular thereto, with respect to the milking stalls in which they are housed. Thus, the three-dimensional camera 21 is, for each of the milking animals, directed towards a leg or an outer contour of the milking animal in the milking stall, wherein the three-dimensional camera 21 records a three-dimensional image in real time of the leg or the outer contour of the milking animal. The image processing means 22 detects the milking animal and determines its position in the spatial dimension by the calculation method based on the recorded three-dimensional image of the leg or the outer contour of the milking animal.

Such embodiment may be advantageous in a milking system where a detection device is used to detect the teats of a milking animal in a milking stall based on the prior knowledge of where in the milking stall the milking animal is located and possibly on the physical dimensions of the milking animal itself.

Thus, the control device 19 may, for each of the milking animals, hold information in, or receive information from, a database 23 regarding the position of the udder of the milking animal relative the milking animal itself. This may be a single approximate figure valid for all the animals. Further, the control device 19 directs the three-dimensional camera 21 and controls the robot arm 15 of the milking robot 14 to move towards the udder of the milking animal based on the information of the position of the at least one teat of the milking animal relative the milking animal itself, and on the detected position of the milking animal in the spatial dimension relative the milking stall.

The information of the position of the at least one teat of the milking animal relative the milking animal itself can be deduced from the recording of visual detections of the milking animal in connection with an earlier milking of the milking animal.

The inventive arrangement for determining teat positions is particularly advantageous in situations where one or more teats are obscured and is/are not clearly detectable by the three-dimensional camera. Thus, the control device 19 may, for each of the milking animals, hold information in, or receive information from, the database 23 regarding the position of each of the teats of the milking animal relative the other teats of the milking animal. Further, the control device 19 controls the robot arm 15 of the milking robot 14 to move a teat cup to an obscured teat of the milking animal based on the information of the position of each of the teats of the milking animal relative the other teats of the milking animal and on a determined position of a repeatedly detected teat of the milking animal, which is not obscured.

In one version the above algorithm is applied in an arrangement where the three-dimensional camera is, during each of the recordings of the three-dimensional images, located behind the milking animal and is directed forward towards the back of the milking animal. The spatial dimension determined is then preferably in a direction perpendicular to a longitudinal direction of the milking stall. The leg or outer contour of the milking animal may include one or both back legs of the milking animal, preferably the inner contours of the back legs.

The determination of the positions of the teats of the milking animal can be made in the following manner. First the milking animal is detected and the position thereof is determined. Based on this information the contour of the back legs and the body therein between is detected and the positions thereof are determined. Based on this information an area of interest (i.e. where the teats most probably are found) is located, and in this area the udder of the milking animal is searched for. When the udder has been detected and located the teats are searched for and located. Finally, when the positions of the teats have been determined the teat cup attachment can be initiated.

Such algorithm is characterized by fast object recognition and can be applied in situations where a new milking animal is detected or where a milking animal has a position of the legs which renders the determination of the teat positions more difficult.

It shall further be appreciated that the arrangement of the present invention may be used as a multifunctional detection system for detecting any of the following: (i) presence of a milking animal in a milking stall, (ii) the behavior of a milking animal, (iii) the activity of a milking animal, (iv) the body shape of a milking animal, (v) an incorrect teat cup attachment, (vi) a teat cup kick-off, (vii) presence of an obstacle in the working area of the milking robot, (viii) a parameter related to the operation of the milking robot, and (ix) a parameter related to the operation of the three-dimensional camera.

Figure 2:
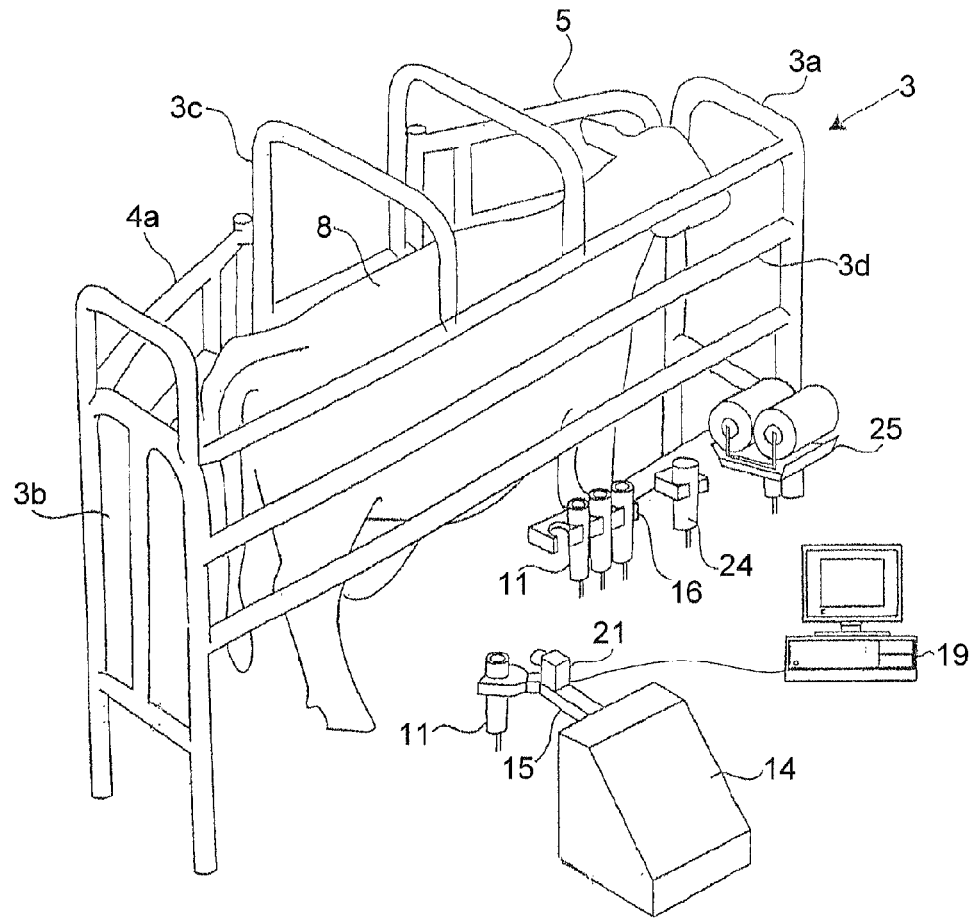

With reference next to FIG. 2 a further embodiment of the present invention will be described. The arrangement for determining teat positions is here implemented in a voluntary milking system or station 3 comprising an enclosure having an inlet gate 4 and an outlet gate 5, which are both capable of being opened automatically. The front end of the milking station 3 is denoted by 3a, the back end is denoted by 3b, the sides are denoted by 3c and 3d.

The milking station 3 comprises further an automatic milking machine (not explicitly illustrated) including teat cups 11 connected to an end unit by means of milk lines (only the portions attached to the teat cups 11 are shown in FIG. 2). The milking station further includes a milking robot 14 having a movable robot arm 15 provided with a gripper. The milking robot 14 is arranged to automatically apply the teat cups 11 of the milking machine to the teats of a milking animal 8 present in the milking station 3 prior to milking. In FIG. 2 three of the teat cups 11 are arranged in a teat cup rack or magazine 16, whereas the fourth one is held by the gripper of the robot arm 15. Typically, a teat cleaning device including e.g. a teat cleaning cup 24 or brushes 25 may be provided for cleaning the teats of the milking animal 8 prior to milking.

Further, the milking station 3 comprises an identification device (not illustrated) provided to identify a milking animal approaching the milking station 3, and a control device 19, which is responsible for controlling of the milking system, which inter alia includes the initiation of various activities in connection with the milking such as e.g. opening and closing of the gates 4 and 5, and control of the milking machine and its handling device 14

The arrangement for determining teat positions comprises a three-dimensional time-of-flight real time camera 21 for repeatedly recording three-dimensional images of the udder of the milking animal in real time. Image processing means 22 of e.g. the control device 19 detects repeatedly the teats of the milking animal and determines their positions in all three spatial dimensions based on the repeatedly recorded three-dimensional images of the udder of the milking animal 8.

The three-dimensional camera 21 is mounted on the movable robot arm 15 of the milking robot 14 and the control device 19 is thus provided for determining the positions of the teats of the milking animal in all three spatial dimensions relative the movable robot arm 15.

The inventive arrangement may further be arranged for determination of the positions and orientations of the teat cups 11, the teat cleaning cup 24, and the brushes 25.

Figure 3:
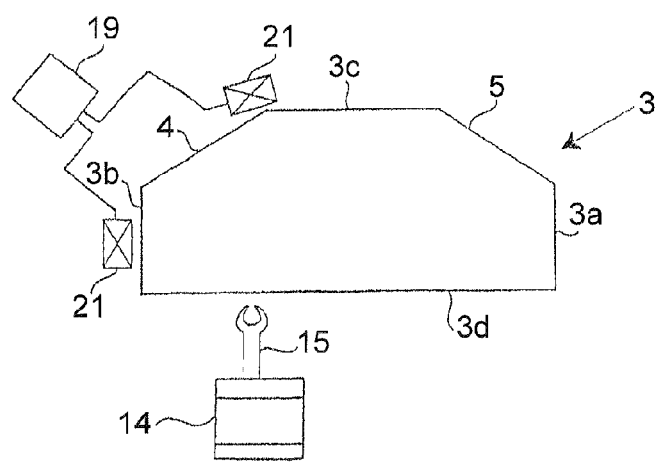

FIG. 3 illustrates a further embodiment of the invention wherein the arrangement for determining teat positions is implemented in a voluntary milking system of the above kind. Here, two three-dimensional cameras 21 are mounted in fixed positions with respect to the milking station 3. One three-dimensional camera 21 is arranged to record three-dimensional images of the udder of a milking animal from behind and one three-dimensional camera 21 is arranged to record three-dimensional images of the udder of the milking animal from a side.

The image processing means of the control device 19, to which the three-dimensional cameras 21 are operatively connected, is provided for determining the positions of the teats of the milking animal in all three spatial dimensions relative the milking station 3 based on three-dimensional images recorded by the two three-dimensional cameras.

It shall be appreciated that the inventive arrangement for determining teat positions of the present invention may be implemented in virtually any kind of milking system where the teat positions need to be found automatically.

There are many prior art techniques for determining the identities of milking animals, however, many of them being complex or requiring the providing of each of the milking animals to be identified with a transducer or tag.

Figure 4:
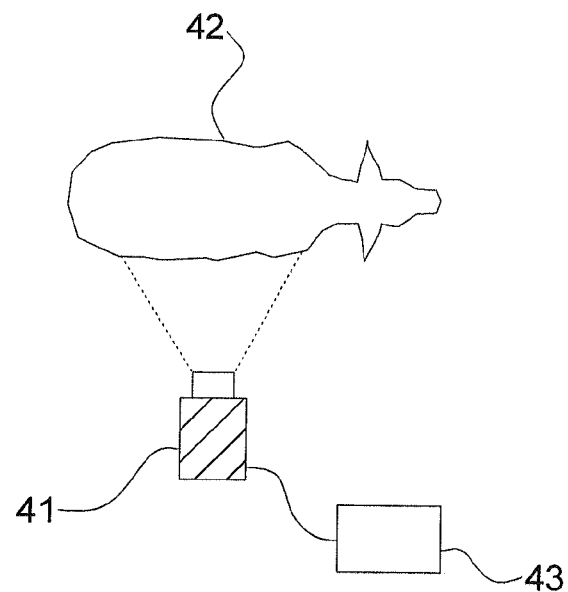
FIG. 4 displays schematically, in a top view, an arrangement for determining the identity of a milking animal according to an embodiment of the present invention.

FIG. 4 shows a novel arrangement for determining the identity of a milking animal based on the above three-dimensional measurement concept. A three-dimensional camera 41, preferably a three-dimensional time-of-flight camera, is directed towards the milking animal 42, or a part thereof, wherein the three-dimensional camera is arranged to record a three-dimensional image of the milking animal, or the part thereof. An image processing device 43 is provided for digitally processing the recorded three-dimensional image and for determining the identity of the milking animal among a group of milking animals based on comparisons between the digitally processed three-dimensional image and (i) physical parameters characteristic for each milking animal of the group of milking animals or (ii) previously recorded digitally processed three-dimensional images of each milking animal of the group of milking animals.

Preferably, the three-dimensional camera 41 is provided to record the three-dimensional image to be digitally processed as a three-dimensional image of the udder/teats of the milking animal 42, preferably from a position below the udder of the milking animal 42. Alternatively, the three-dimensional camera 41 is positioned elsewhere and/or oriented differently.

The physical parameters characteristic for the milking animals can be found by detailed analysis of digital images of the milking animals, e.g. as recorded by the three-dimensional camera 41.

The above arrangement is less complicated than prior art systems. The milking animals have not to be provided with transducers or tags. A three-dimensional camera, which may already be provided for other purposes such as e.g. the above determination of teat positions, can be used for the identification. Thus, less equipment is needed for the achievement of a certain number of functions of the milking system.

Further, the time-of-flight based three-dimensional imaging technology provides for rapid and direct identification of milking animals.

Still further, the arrangement may be provided for detecting damaged or swollen teats or any other abnormal teat condition and to alert a dairy farmer of such condition.

It shall be appreciated that the above arrangement may be implemented in a milking system or a milking stall, but alternatively it may be implemented in a feeding station, at a gate arrangement, or elsewhere at a dairy farm.

In the prior art the weights of milking animals are typically determined by weighing devices, onto which the milking animals are led or guided. Such devices, however, are bulky and costly.

Figure 5:
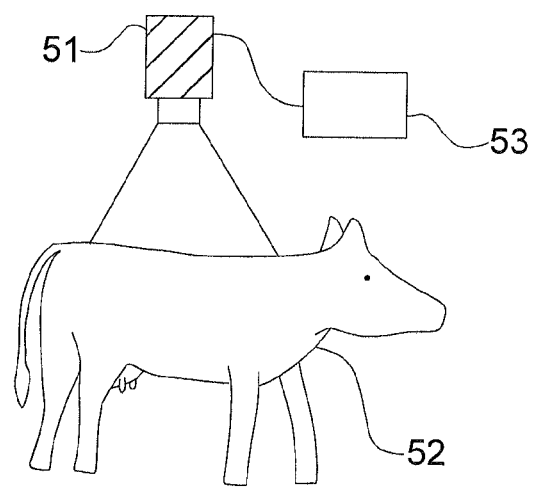
FIG. 5 displays schematically, in a side elevation view, an arrangement for determining the weight of a milking animal according to an embodiment of the present invention.

FIG. 5 shows a novel arrangement for determining the weight of a milking animal 52 based on the above three-dimensional measurement concept. A three-dimensional camera 51, preferably a three-dimensional time-of-flight camera, is directed towards the milking animal 52, wherein the three-dimensional camera is provided to record a three-dimensional image of the milking animal. An image processing device 53 is provided for digitally processing the recorded three-dimensional image and for determining the weight of the milking animal based on the digitally processed three-dimensional image and a table which correlates dimensions or volumes with weights for the species or breed, to which the milking animal belongs.

Preferably, the three-dimensional camera 51 is located above the milking animal 52 and is directed downwards towards the milking animal 52. The camera may be located at an angle α with respect to a vertical plane parallel with a longitudinal direction of the milking animal 52.

In one version, the arrangement comprises a second three-dimensional camera (not illustrated) directed towards the milking animal, wherein the three-dimensional cameras are provided to record three-dimensional images of the milking animal at different view angles, wherein the image processing device 53 is provided for digitally processing the recorded three-dimensional images and for determining the weight of the milking animal based on the digitally processed three-dimensional images and the table which correlates dimensions with weights for the breed, to which the milking animal belongs.

Alternatively, the three-dimensional images of the milking animal at different view angles may be recorded by a single three-dimensional camera, which is movable between at least two positions. For instance, the three-dimensional camera may be movable between two positions located at each side of a vertical plane parallel with a longitudinal axis of the animal.

The above arrangement is less bulky than a conventional weighing device and the arrangement may be used for other purposes as well. The arrangement may be implemented at any location of a dairy farm.

It shall be noted that the arrangement of FIG. 4 may be arranged for determining or calculating a body score index (BSI), which can be used as a parameter related to the health of the milking animal. While any of the above described camera locations may be used for body score index determinations, it seems like that locating the three-dimensional camera 51 above the milking animal 52 at an angle α with respect to a vertical plane parallel with a longitudinal direction of the milking animal 52 and directing the camera diagonally downwards towards the milking animal 52 is a preferred option.

By placing the camera so that the important body parts for body score index can be exposed and then making a computer "cut out" of the model, a calculation of the volume can be made. From a reference value for each milking animal stored in a database, a current body score index can be determined.

It shall further be noted that the arrangements of FIGS. 4 and 5 may be applied to other animals than milking animals.

It shall be appreciated by a person skilled in the art that various features of the above embodiments can be combined to form yet further embodiments of the present invention. Particularly, a multifunctional arrangement may be provided for determining teat positions, for identifying animals, and for weighing animals.

The invention claimed is:

1. An arrangement for attaching teat cups to teats of a milking animal in a rotary milking system having a rotatable milking stall for housing the milking animal during milking, the arrangement comprising:
   a three-dimensional camera configured to be directed towards the udder of the milking animal in the rotatable milking stall and to repeatedly record three-dimensional images of the udder of the milking animal in real time, said three-dimensional camera further configured to be directed towards the teat cups located in a magazine, configured to rotate with the rotatable milking stall, and to repeatedly record three-dimensional images of the teat cups in real time, wherein the three-dimensional camera is configured to not rotate along with the rotatable milking stall and the rotatable magazine;
   an image processing device configured to:
   repeatedly detect the teats of the milking animal in the rotatable milking stall and determine the positions of the teats in three spatial dimensions based on said repeatedly recorded three-dimensional images of the teats, and
   repeatedly detect the plurality of teat cups in the rotatable magazine and determine the positions of the teat cups in three spatial dimensions based on said repeatedly recorded three-dimensional images of the teat cups located in the rotatable magazine; and
   a control device configured to control a robot arm, based on the determined positions of the teats of the milking animal and the determined positions of the teat cups, to automatically attach at least one teat cup to at least one teat of the milking animal in the rotatable milking stall.

2. The arrangement of claim 1, wherein said three-dimensional camera is a three-dimensional time-of-flight camera.

3. The arrangement of claim 1, wherein said image processing device is configured to simultaneously determine positions of all of the teats of the milking animal in three spatial dimensions.

4. The arrangement of claim 1, wherein said image processing device is configured to:
   form a three-dimensional surface representation of at least a portion of the milking animal from at least one of the three-dimensional images;
   analyze a surface of the three-dimensional surface representation; and
   determine the position of the teats of the milking animal based on the analysis of the surface of the three-dimensional surface representation.

5. The arrangement of claim 4, wherein said analysis includes comparing elevations of adjacent portions of said surface of the three-dimensional surface representation.

6. The arrangement of claim 4, wherein said analysis includes comparing elevation gradients of said surface of the three-dimensional surface representation with reference gradients.

7. The arrangement of claim 1, wherein said three-dimensional camera is movable between a first position at which said three-dimensional camera records said three-dimensional images and a second position at which said three-dimensional camera is in an idle state.

8. The arrangement of claim 1, wherein:
   said three-dimensional camera is configured to be directed towards a leg or an outer contour of the milking animal in the milking stall to record a three-dimensional image in real time of the leg or the outer contour of the milking animal; and
   the image processing device is configured to detect the milking animal and determine a position of the milking animal in at least one spatial dimension based on said recorded three-dimensional image of the leg or the outer contour of the milking animal.

9. The arrangement of claim 8, wherein said leg or outer contour of the milking animal includes a back leg of the milking animal.

10. The arrangement of claim 8, wherein said image processing device is configured to first detect and determine the position of the milking animal, and to thereafter detect and determine the position of the udder of the milking animal based on the position of the milking animal.

11. The arrangement of claim 8, wherein:
   said three-dimensional camera is, when recording said three-dimensional images of the leg or the outer contour of the milking animal, located behind the milking animal and directed towards the back of the milking animal; and
   said at least one spatial dimension is in a direction perpendicular to a longitudinal direction of the milking stall.

12. The arrangement of claim 1, wherein said three-dimensional camera is, when recording said three-dimensional images of the teats, located at a side of the milking animal and is directed towards a side of the milking animal.

13. The arrangement of claim 1, wherein said three-dimensional camera is, when recording said three-dimensional images of the teats, located below the milking animal and is directed upwards towards the milking animal.

14. The arrangement of claim 1, wherein the control device is configured to receive information on the position of each teat of the milking animal relative the other teats of the milking animal and control said robot arm to move to an obscured teat of the milking animal based on said received information and on the determined position of a repeatedly detected teat of the milking animal that is not obscured.

15. The arrangement of claim 1, wherein said arrangement is a multifunctional detection system further configured to detect at least one of:
   (i) presence of the milking animal in the milking stall,
   (ii) a behavior of the milking animal,
   (iii) an activity of the milking animal,
   (iv) a body shape of the milking animal,
   (v) an incorrect teat cup attachment,
   (vi) a teat cup kick-off,
   (vii) presence of an obstacle in a working area of the robot arm,
   (viii) a parameter related to an operation of the robot arm, or
   (ix) a parameter related to an operation of the three-dimensional camera.

16. The arrangement of claim 1, wherein:
   said three-dimensional camera is configured to record a three-dimensional image of at least a portion of the milking animal; and
   the image processing device is configured to digitally process the recorded three-dimensional image of the at least one portion of the milking animal and determine an identity of the milking animal based on comparisons between the digitally processed three-dimensional image and:
   (i) a physical parameter characteristic associated with the milking animal, or
   (ii) a previously recorded digitally processed three-dimensional image of the milking animal.

17. The arrangement of claim 16, wherein the three-dimensional camera is provided to record a three-dimensional digital image of the udder of the milking animal from a position below the udder of the milking animal.

18. The arrangement of claim 1, wherein:
   said three-dimensional camera is configured to be directed towards the milking animal to record a further three-dimensional image of the milking animal; and
   the image processing device is configured to digitally process the further recorded three-dimensional image and determine the weight of the milking animal based on the digitally processed further three-dimensional image and a table that correlates dimensions or volumes with weights for the species or breed to which the milking animal belongs.

19. The arrangement of claim 18, wherein said three-dimensional camera is located above the milking animal and is directed downwards towards the milking animal when recording the further three-dimensional image of the milking animal.

20. The arrangement of claim 18, wherein:
   said arrangement comprises a second three-dimensional camera configured to be directed towards the milking animal to record three-dimensional images of the milking animal at different view angles; and
   the image processing device is configured to digitally process the recorded three-dimensional images at different view angles and determine the weight of the milking animal based on the digitally processed three-dimensional images at different view angles and the table that correlates dimensions with weights for the breed to which the milking animal belongs.

21. A method for attaching teat cups to the teats of a milking animal in a rotary milking system having a rotatable milking stall for housing the milking animal during milking, said method comprising:
   directing a three-dimensional camera towards the teats of the milking animal in the rotatable milking stall;
   repeatedly recording three-dimensional images of the teats of the milking animal in real time by said three-dimensional camera;

repeatedly recording three-dimensional images of teat cups located in a magazine, configured to rotate with the rotatable milking stall, in real time by said three-dimensional camera and determining the positions of the teat cups in three spatial dimensions based on said repeatedly recorded three-dimensional images of the teat cups located in the rotatable magazine, wherein the three-dimensional camera is configured to not rotate along with the rotatable milking stall and the rotatable magazine;

repeatedly detecting the teats of the milking animal in the rotatable milking stall and determining the positions of the teats in three spatial dimensions based on said repeatedly recorded three-dimensional images of the teats; and automatically attaching at least one teat cup, from the rotatable magazine, to at least one teat of the milking animal in the rotatable milking stall based on the determined position of the teats.

22. The method of claim 21, wherein said three-dimensional camera is a three-dimensional time-of-flight camera.

23. An arrangement for attaching teat cups to teats of a milking animal in a rotary milking system having a rotatable milking stall for housing the milking animal during milking, the arrangement comprising:

a three-dimensional camera configured to be directed towards the udder of the milking animal in the rotatable milking stall and to record three-dimensional images of the udder of the milking animal, said three-dimensional camera further configured to be directed towards teat cups located in a magazine, configured to rotate with the rotatable milking stall, and to record three-dimensional images of the teat cup, wherein the three-dimensional camera is configured to not rotate along with the rotatable milking stall and the rotatable magazine;

an image processing device configured to:

detect the teats of the milking animal in the rotatable milking stall and determine the positions of the teats in three spatial dimensions based on said recorded three-dimensional images of the teats, and detect the plurality of teat cups in the rotatable magazine and determine the positions of the teat cups in three spatial dimensions based on said recorded three-dimensional images of the teat cups located in the rotatable magazine; and a control device configured to control a robot arm, based on the determined positions of the teats of the milking animal and the determined positions of the teat cups, to attach at least one teat cup to at least one teat of the milking animal in the rotatable milking stall.

* * * * *